US008746795B2

(12) United States Patent
Stoia et al.

(10) Patent No.: US 8,746,795 B2
(45) Date of Patent: Jun. 10, 2014

(54) MANUALLY LONGITUDINALLY ADJUSTABLE MOTOR VEHICLE SEAT

(75) Inventors: Dan Stoia, Stadthagen (DE); Bertrand Touzet, Pollhagen (DE)

(73) Assignee: Faurecia Autositze GmbH, Stadthagen (DE)

(*) Notice: Subject to any disclaimer, the term of this patent is extended or adjusted under 35 U.S.C. 154(b) by 176 days.

(21) Appl. No.: 13/296,113

(22) Filed: Nov. 14, 2011

(65) Prior Publication Data

US 2012/0187734 A1 Jul. 26, 2012

(30) Foreign Application Priority Data

Nov. 13, 2010 (DE) ........................ 10 2010 051 336

(51) Int. Cl.
*B60N 2/02* (2006.01)

(52) U.S. Cl.
USPC ........................ 297/341; 297/340; 297/378.1

(58) Field of Classification Search
USPC ...................................... 297/340, 341, 378.1
See application file for complete search history.

(56) References Cited

U.S. PATENT DOCUMENTS 5,695,247 A * 12/1997 Premji .......................... 297/341
6,227,596 B1 * 5/2001 Foucault et al. ........... 296/65.13
6,352,310 B1 * 3/2002 Schmidt et al. .......... 297/378.12
6,799,801 B2 * 10/2004 Niimi et al. .............. 297/378.12
7,172,249 B2 * 2/2007 Rausch et al. ................ 297/341
7,775,591 B2 * 8/2010 Hahn et al. .................... 297/341
2004/0075324 A1 * 4/2004 Rausch et al. ................ 297/341

FOREIGN PATENT DOCUMENTS

DE 202004011387 12/2005
FR 2865974 8/2005

* cited by examiner

*Primary Examiner* — Philip Gabler
(74) *Attorney, Agent, or Firm* — Jennifer S. Stachiniak; Robert W. Becker

(57) ABSTRACT

Longitudinally adjustable motor vehicle seat comprising opposite rail pairs; a lower rail for securement to a chassis and an upper rail secured to a seat component, displaceable in the lower rail. Two pivotable levers are associated with the rail pairs. A second lever is connected to a locking mechanism for securing the upper rail; both levers are connected to a seat backrest. Upon operation of a control member connected to the levers for comfort-longitudinal seat adjustment, a first lever synchronously pivots the second lever to release the locking mechanism. A Bowden cable is connected to the backrest for adjustment when the backrest is folded forward into an easy-entry-position. A Bowden cable core is attached to the first lever, and a sheathing thereof is secured to the second lever. In a neutral position, the sheathing presses the first lever against an abutment secured to the upper rail.

6 Claims, 6 Drawing Sheets

MANUALLY LONGITUDINALLY ADJUSTABLE MOTOR VEHICLE SEAT

The instant application should be granted the priority date of Nov. 13, 2010, the filing date of the corresponding German patent application 102010051336.9.

BACKGROUND OF THE INVENTION

The present invention relates to a manually, longitudinally adjustable motor vehicle set.

A motor vehicle seat is known from FR 2 865 974 B1. On each of its sides oriented in the longitudinal direction of the vehicle, this known seat has a rail pair, comprised of a lower rail and an upper rail, with the upper rail being longitudinally displaceably mounted in the lower rail, and being capable of being fixed in position, by locking means, in various longitudinal positions on the lower rail to provide to an occupant a comfortable seating on the vehicle seat that is adapted to his or her anatomical characteristics. The lower rail is connected to the chassis of the vehicle, and the upper rail is connected to a component of the vehicle seat.

In addition to the above-described comfort-longitudinal adjustment of the seat, this known seat has a so-called easy-entry function, which is used in particular in two-door vehicles to make getting into and out of rear seats of the vehicle easier for passengers. This function allows the vehicle seat, when the backrest is folded forward, to be shifted further toward the front on its rails that are provided for longitudinal adjustment beyond the region of the comfort-longitudinal adjustment of the seat.

Provided between the upper rails and lower rails are release means, for releasing the locking, that are provided with a first lever and a second lever that are associated with each rail pair. The two levers are pivotable on a common pivot shaft that is secured to the upper rail. The first lever is connected to an actuation handle that is disposed in the front, lower region of the seat component, and that serves for the comfort-longitudinal adjustment of the seat. To effect a comfort-longitudinal adjustment of the seat, an occupant sitting on the seat grabs the actuation handle and pulls it up. This pivot movement is transmitted to the first lever that is connected with the actuation handle. The first lever consequently pivots on the pivot shaft that is secured to the upper rail, as a result of which a release finger that is monolithically formed with the first lever releases the locking means between the upper rail and the lower rail. With the actuation handle being held, the vehicle seat can now be adjusted into the desired longitudinal position. After this position is achieved, the actuation handle is released, as a result of which the upper rails and the lower rails are again locked together.

The core of a Bowden cable that is connected with the backrest of the seat is mounted in the second lever. The sheathing of this Bowden cable is secured to a support that is secured to the upper rail. When the actuation handle is not actuated, the first lever rests upon an abutment that is formed by an angled-off portion of the second lever. If the backrest is now folded forward in order to establish the easy-entry-position of the vehicle seat, the Bowden cable, which is connected with the backrest, exerts tension upon the second lever, which consequently pivots upon the pivot shaft that is secured to the upper rail and synchronously takes the first lever along with it, i.e., both levers pivot upon the common pivot shaft simultaneously and in the same direction. As a result, the release finger of the first lever again comes into contact with the locking means, i.e., it releases the locking means, so that in addition to the folding of the backrest forward, the vehicle seat can be shifted into an easy-entry-position. The pivot movement of the second lever is transmitted not only to the first lever, but also to the actuation handle that is connected to the first lever, i.e., the actuation handle pivots as if it were operated. However, such a movement of the actuation handle while bringing about the easy-entry-position of the vehicle seat is frequently not desired.

It is therefore an object of the present invention to provide a motor vehicle seat of the aforementioned general type that provides for an uncoupling of the actuation or control handle or member from the easy-entry-function of the motor vehicle seat.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
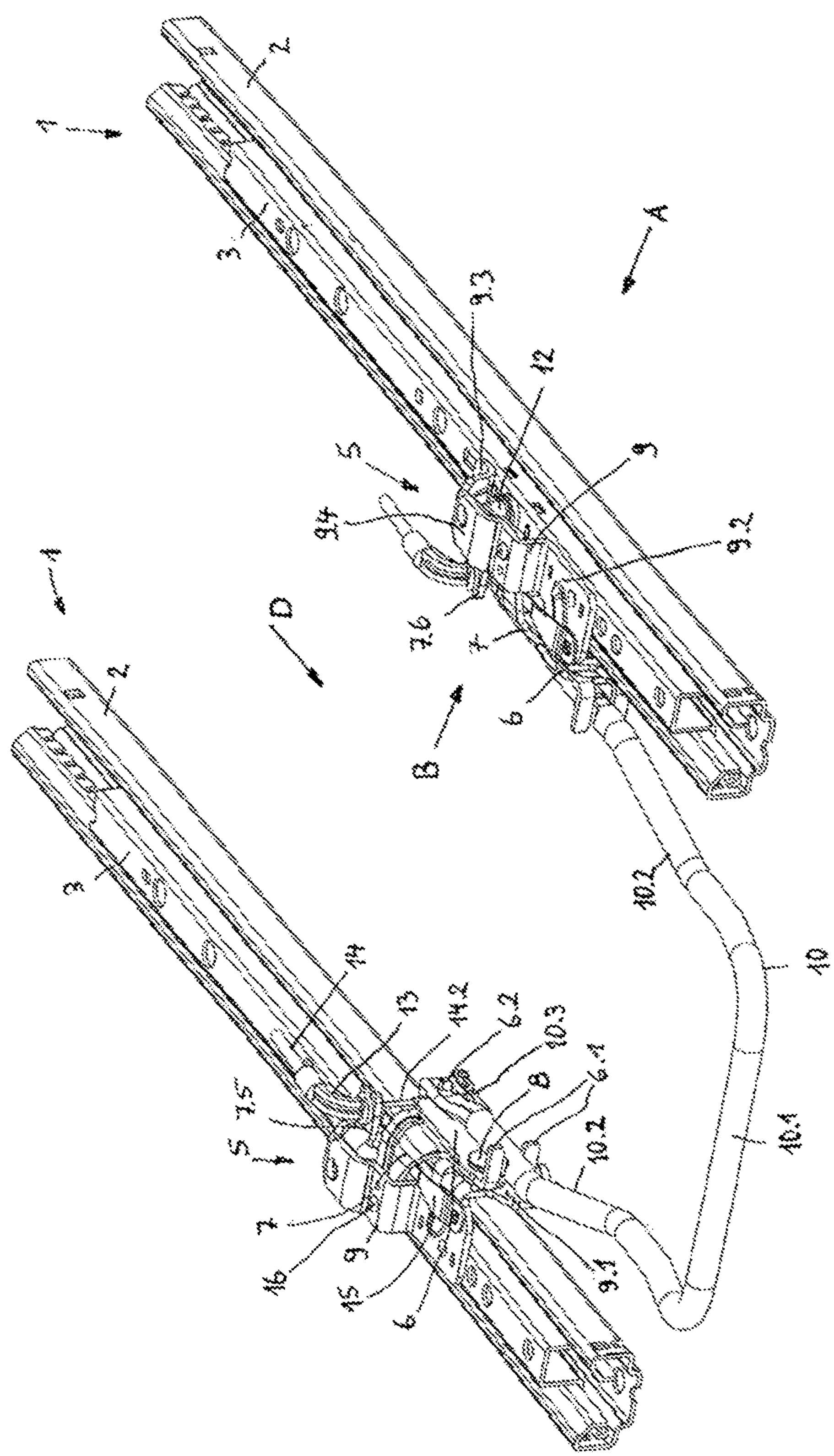
FIG. 1 is a perspective view taken at an angle from the front and above onto the rail pairs of the longitudinal adjustment of a non-illustrated motor vehicle seat, including means for the comfort-release and the easy-entry release.

The object of the present application is realized by a manually longitudinally adjustable motor vehicle seat, comprising: a respective rail pair disposed on opposite sides of a motor vehicle seat, wherein each rail pair is comprised of a lower rail, which is configured for securement to a vehicle chassis, and an upper rail, which is longitudinally displaceable in the lower rail and is configured for securement to a component of the motor vehicle seat, and wherein a pivot shaft is secured to the upper rail; locking mechanisms for securing the upper rails in position on the lower rails; release mechanisms for releasing the locking mechanisms, wherein each release mechanism comprises:

a first lever associated with one of the rail pairs, wherein the first lever is pivotably seated on the pivot shaft, and wherein the first lever is operatively connected to a backrest of the motor vehicle seat; a second lever associated with one of the rail pairs, wherein the second lever is also pivotably seated on the pivot shaft, further wherein the second lever is provided with take-along means, and wherein the second lever is operatively connected to the locking mechanism and to the backrest of the motor vehicle seat; a control member operatively connected to the first and second levers for a comfort-longitudinal adjustment of a motor vehicle seat, wherein the first lever is connected to the control member and is configured such that upon operation of the control member, the first lever pivots on the pivot shaft and synchronously pivots the second lever, via the take-along means, for release of the locking mechanism; a Bowden cable connected to the backrest of the motor vehicle seat and configured for an easy-entry-longitudinal adjustment of the motor vehicle seat when the backrest is folded forward into an easy-entry-position, wherein a core of the Bowden cable is attached to the first lever, and wherein a sheathing of the Bowden cable is secured to the second lever; and an abutment secured to the upper rail, wherein the first lever, in a non-actuated, neutral position, rests upon the abutment, and wherein the sheathing biases or presses the first lever against the abutment.

With the inventive solution, for the comfort-release of the rail pairs once again the control member is operated. This pivot movement of the control member is transmitted to the first lever. Since the first lever is connected to the second lever via take-along means, both levers pivot upon the common pivot shaft in the same direction and at the same time, as a consequence of which the locking between the upper rail and the lower rail is released by the second lever. Due to the synchronous pivoting of the first lever and of the second lever, their position relative to one another remains unaltered during the pivot movement. This is also applicable to the Bowden cable, since the distance between the fixation of the sheathing of the Bowden cable on the second lever, and the point of attachment of the core of the Bowden cable to the first lever, remain unaltered. As a result, no tension is exerted upon the core of the Bowden cable. The comfort-release is thus uncoupled from the easy-entry release.

For the easy-entry release of the rail pairs, the backrest of the motor vehicle seat is folded to the front. As a result, tension is exerted upon the core of the Bowden cable. Since the core is suspended in the first lever, the tension of the core would lead to pivoting of the first lever upon the pivot shaft secured to the upper rail, and in particular in a direction opposite to its pivot movement during the comfort-release. However, since the first lever, in its non-activated position, rests upon an abutment that is secured to the upper rail, it cannot pivot in this direction. As a result, the Bowden cable sheathing, which is secured to the second lever, exerts pressure upon the second lever, so that the second lever pivots upon the pivot shaft that is secured to the upper rail and thus releases the locking between the upper rail and the lower rail. Due to the described execution, the control member is uncoupled from the easy-entry release; in other words, during the establishment of the easy-entry position of the motor vehicle seat, the control member does not carry out any movements.

Pursuant to further advantageous specific embodiments of the invention, the abutment that is secured to the upper rail can be secured to a mounting flange of a mounting plate, wherein the mounting flange extends downwardly on the inner side of the rail pair, and the mounting plate is secured to the upper rail via securement flanges that are disposed at ends of the mounting plate.

The mounting plate can furthermore be provided with a bridge portion that is disposed between the securement flanges and that serves as an upper abutment for the second lever in its non-actuated position (neutral position). In addition, the second lever can be biased against the abutment by spring means, and the abutment can be formed by a rubber buffer. The mounting plate can be embodied as a monolithic shaped sheet metal part.

Further specific features of the present invention will be described in detail subsequently.

DESCRIPTION OF SPECIFIC EMBODIMENTS

Figure 4:
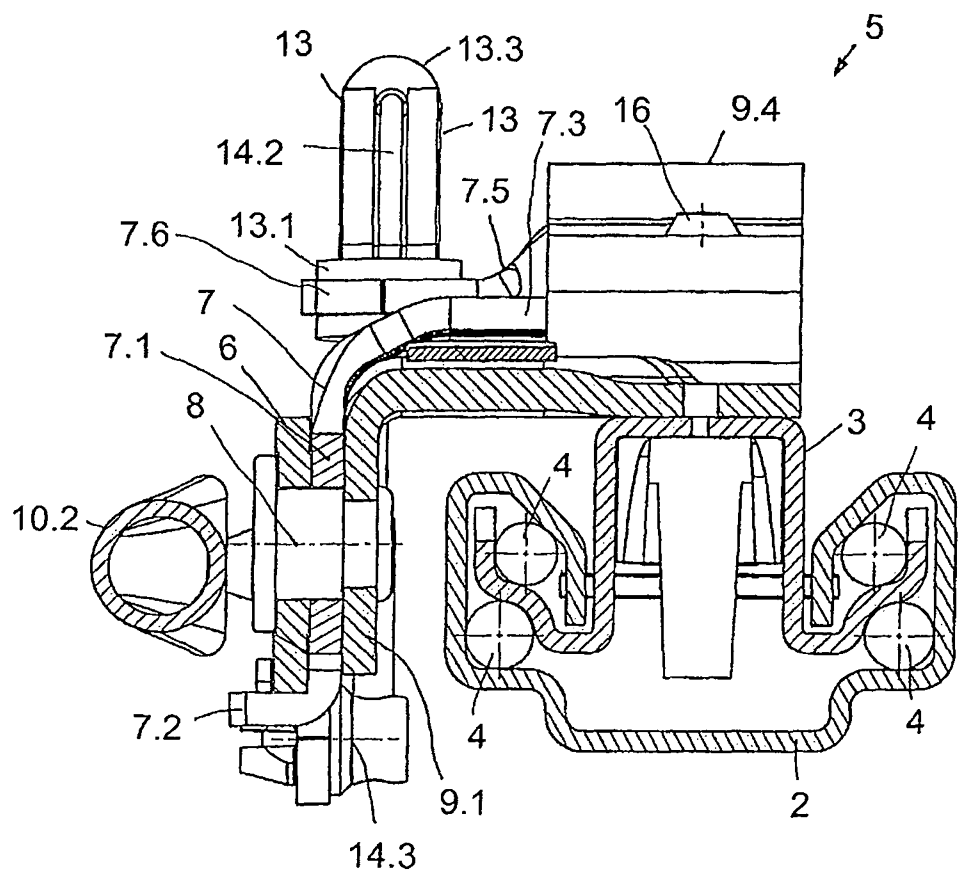
FIG. 4: is an enlarged view taken along the line C-C in FIG. 3.

Referring now to the drawings in detail, FIG. 1 shows rail pairs 1 of a motor vehicle seat that is provided with a comfort-longitudinal adjustment and an easy-entry-longitudinal adjustment. Each rail pair 1 is comprised of a lower rail 2, which is fixedly connected with a non-illustrated chassis of a vehicle, and an upper rail 3, which is fixedly connected with a non-illustrated component of the motor vehicle seat. The upper rails 3 are mounted in the lower rails 2 via ball bearings 4 (FIG. 4) so as to be longitudinally displaceable therein.

The motor vehicle seat is equipped with a release mechanism 5 for the comfort-release or unlocking and the easy-entry-release or unlocking of the upper rails 3 from the lower rails 2. This release mechanism 5 is configured identically on both sides of the seat, and will be explained subsequently with the aid of the left rail pair 1 as viewed in the forward direction of travel (FIG. 1, arrow D).

The release mechanism 5 has a first lever 6 and a second lever 7, which are pivotably mounted on a common pivot shaft 8 that is secured to the upper rail. The pivot shaft 8 is disposed on a mounting flange 9.1 of a mounting plate 9, whereby the mounting flange 9.1 extends downwardly on the inner side of the rail pair 1. The mounting plate 9, as viewed in the forward direction of travel (arrow D), has a front securement flange 9.2 and a rear securement flange 9.3, by means of which the mounting plate 9 is secured to the upper side of the upper rail 3, for example via a threaded connection or by welding. A bridge portion 9.4 is formed in the mounting plate between the securement flanges 9.2 and 9.3, in other words, at this location the mounting plate 9 projects upwardly away from the upper side of the upper rail 3. The mounting plate 9 is formed as a monolithic shaped sheet metal part with its mounting flange 9.1, its securement flanges 9.2 and 9.3, as well as its bridge portion 9.4.

The first lever 6 has a fork-shaped front end, including two spaced-apart tines 6.1, which are angled off at right angles relative to the inner side of each of the oppositely disposed rail pairs 1. At its rear end, the first lever 6 has a pin-shaped projection 6.2. The tines 6.1 and the projection 6.2 serve for the connection of a generally U-shaped actuation or control handle or member 10 with the first lever 6. The control member 10 is a monolithic piece and includes a front handle portion 10.1 and side arms 10.2 that adjoin the handle portion 10.1. The control handle or member 10 is made from a tube, whereby the rear ends of its side arms 10.2 are squeezed together to form a flattened portion 10.3. Provided in the region of the flattened portion 10.3, in the side arms 10.2, is a recess or aperture that serves to receive the projection 6.2 of the first lever 6. For the transmission of a torque from the control member 10 to the first lever 6, the aperture of the flattened portion 10.3 is placed upon the projection 6.2, and the side arms 10.2 are inserted between the tines 6.1.

Figure 5:
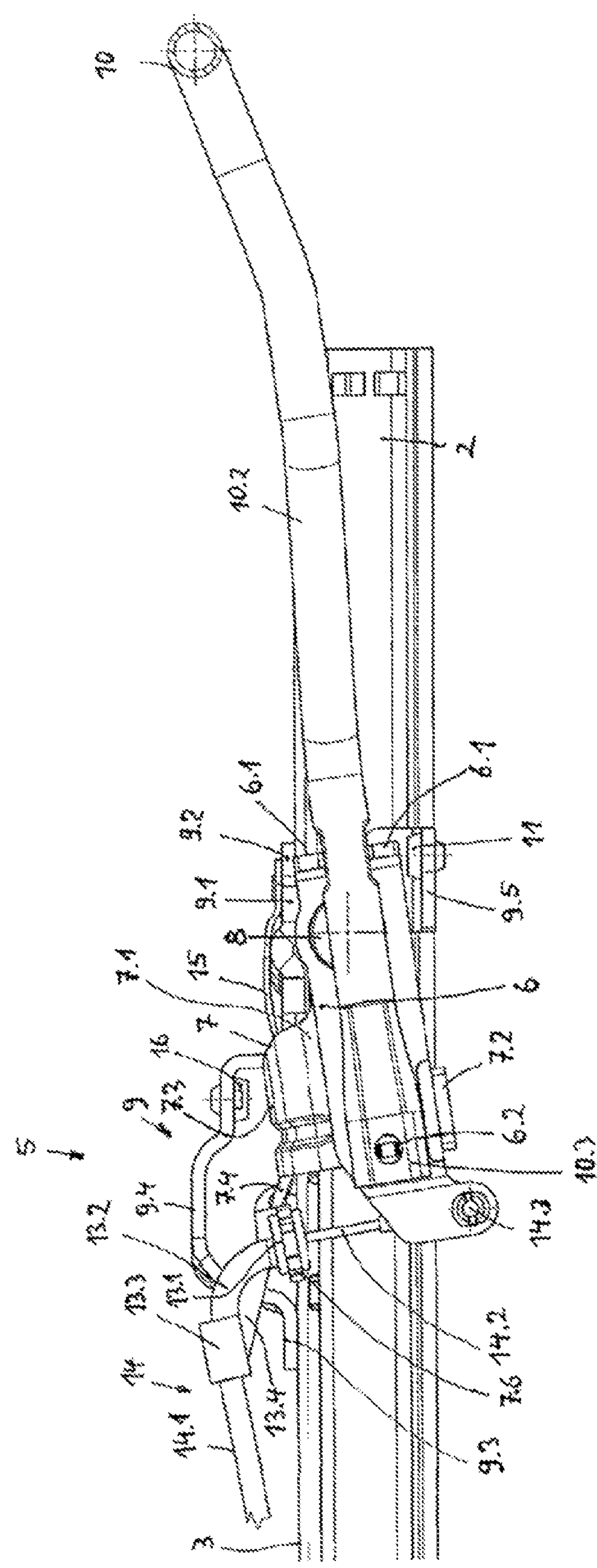
FIG. 5: is an enlarged view of a portion of FIG. 3 during comfort-release.
Figure 6:
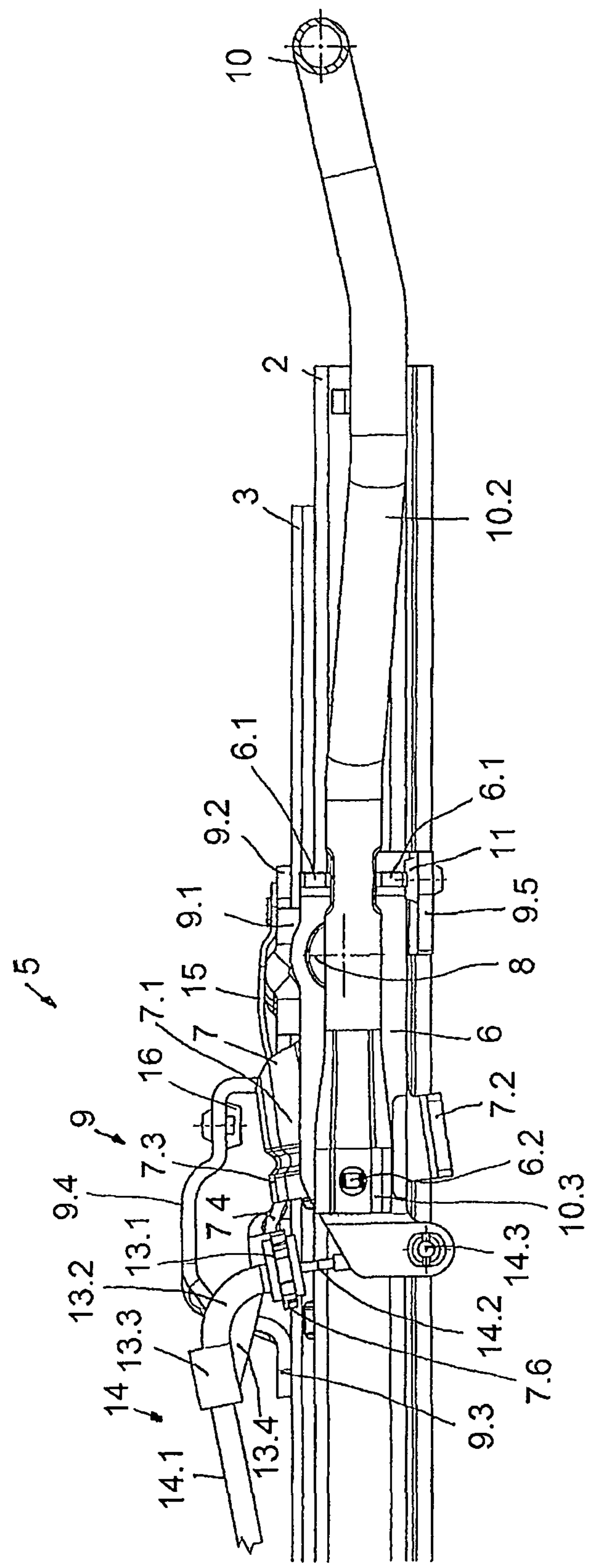
FIG. 6: is an enlarged view of a portion of FIG. 3 during easy-entry release.

When the release mechanism 5 is in the neutral position, i.e. is not actuated, as illustrated in FIGS. 1 to 4, the front end of the first lever 6 rests upon an abutment 9.5 that is secured to the upper rail and is formed by an angling-off of the lower end of the mounting flange 9.1. To avoid metal-to-metal contact at this location, which causes noise, a rubber buffer 11 is inserted into the abutment 9.5 (see FIGS. 3, 5 and 6). Due to the fact that the mounting plate 9 is formed as a monolithic shaped sheet metal part, the abutment 9.5 is very stable and thus contributes to preventing damage to the components of the release mechanism 5 if the control member 10 is incorrectly operated.

The second lever 7 is also embodied as a monolithic shaped sheet metal part, and includes a first portion 7.1 that extends essentially parallel to the rail pair 1 and that receives the pivot shaft 8. This first portion 7.1 is furthermore provided with an angled-off portion 7.2 on which, when the release mechanism 5 is in the neutral position, the rear portion of the first lever 6 rests. The first portion 7.1 of the second lever 7 merges via an arc-shaped curvature into a second portion 7.3, which extends below the bridge portion 9.4 of the mounting plate 9 essentially parallel to the upper side of the upper rail 3. Adjoining this second portion 7.3 of the second lever 7, via a connecting element 7.4, is a third portion 7.5 of the second lever 7, which extends approximately parallel to the second portion 7.3; the end of this third portion 7.5 projects inwardly out of the bridge portion 9.4 of the mounting plate 9. Thus, the portions 7.3 and 7.5 of the second lever 7 approximately form the legs of a U.

Figure 2:
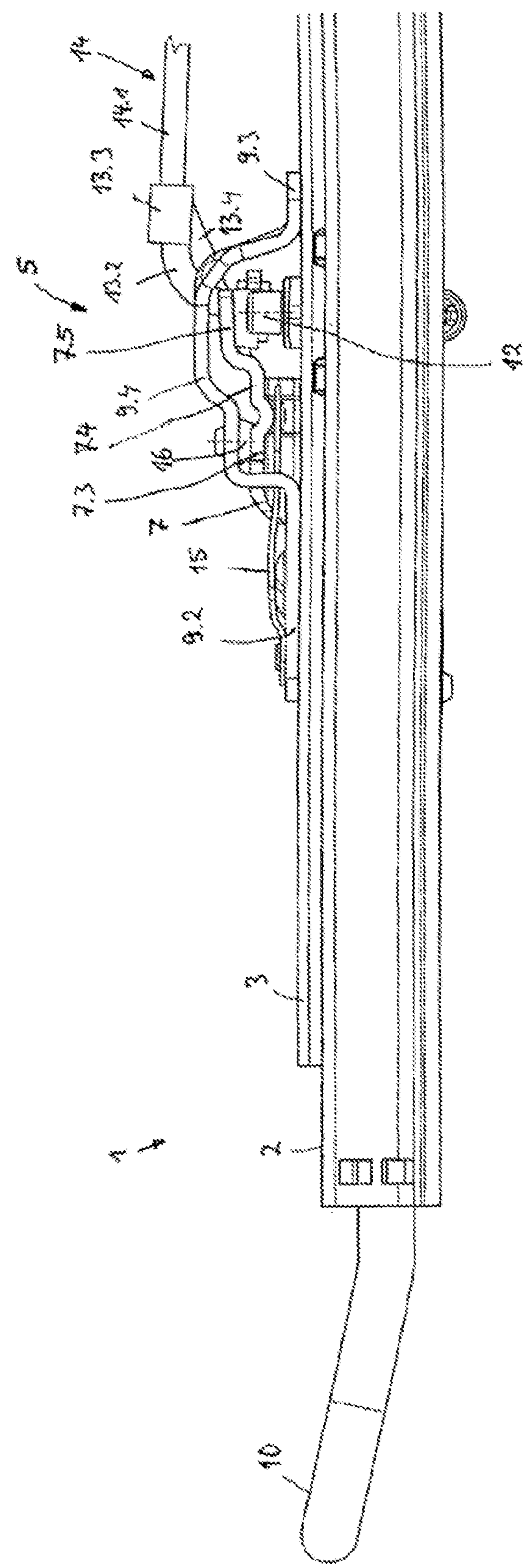
FIG. 2 is an enlarged view of a portion of the subject matter of FIG. 1 taken in the direction of the arrow A in FIG. 1.
Figure 3:
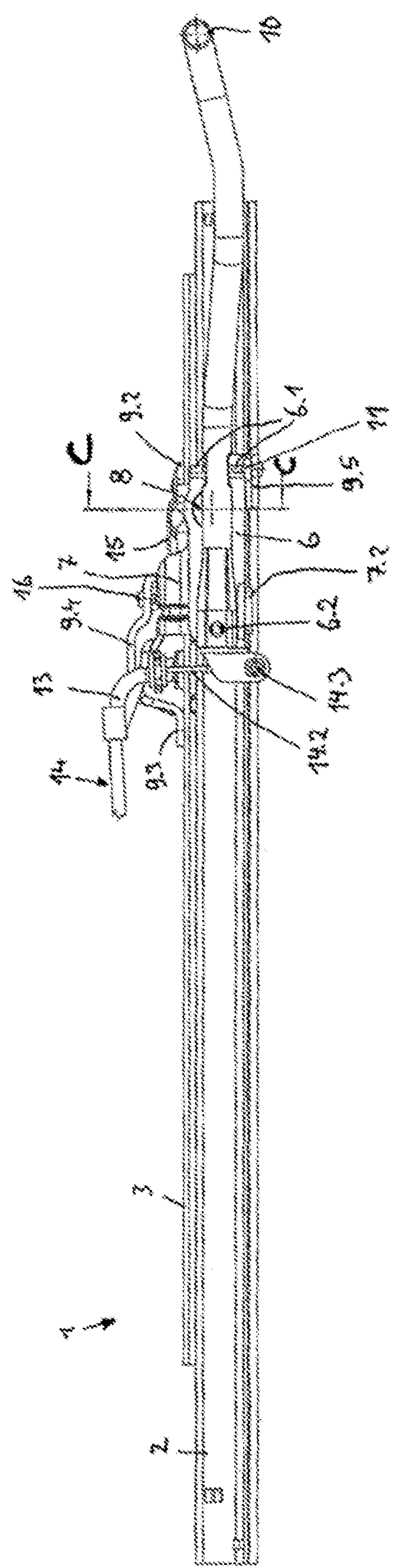
FIG. 3: is a view of the subject matter of FIG. 1 taken in the direction of the arrow B in FIG. 1.

As can be best seen from FIG. 2, the third portion 7.5 of the second lever 7, when the release mechanism 5 is in the neutral position, is spaced above a push member 12, which is biased in the direction of the third portion 7.5 by a non-illustrated spring means. This push member 12 is part of a locking mechanism, which is known to those of skill in the art, and which, in the position shown in FIG. 2, locks the upper rail 3 to the lower rail 2.

The free end of the third portion 7.5 of the second lever 7, which third portion 7.5 projects inwardly beyond the bridge portion 9.4 of the mounting plate 9, is embodied as a fork 7.6. One end 13.1 of a shaped part 13 of polymeric material is placed upon this fork 7.6. A curved channel member 13.2 extends from this one end 13.1 to the other end of the shaped part 13, which is embodied as a collar or bushing 13.3. For reinforcement, the shaped part 13 of polymeric material is provided with a reinforcement fin or similar element 13.4.

The shaped part 13 serves for the securement of the sheathing 14.1 of a Bowden cable 14, which leads to the backrest of the vehicle seat, to the second lever 7. The core 14.2 of the Bowden cable 14 is guided in the curved channel member 13.2, and its end is connected with the rear end of the first lever 6 in a pull-resistant manner by means of a point of attachment 14.3.

A leaf spring 15 is provided to prevent a chattering of the second lever 7 when the release mechanism 5 is in the neutral position. One end of the leaf spring 15 is fastened to the front securement flange 9.2 of the mounting plate 9. The free end of this leaf spring 15 extends below the second lever 7 and rests against the underside of the second portion 7.3, where it presses this portion 7.3 against a rubber buffer 16 that is secured to the bridge portion 9.4 of the mounting plate 9. As a consequence, chattering noises are avoided.

The manner of operation of the release mechanism 5 will be described subsequently.

For the comfort-release of the longitudinal adjustment of the motor vehicle seat, the control handle or member 10 is pulled upwardly. As a consequence, the first lever 6 pivots in the same direction about its pivot shaft 8. Along this pivot path, the first lever 6 synchronously takes the second lever 7 along with it, since the lever 6 rests upon the abutment 7.2 of the second lever 7. During these pivot movements of the first lever 6 and of the second lever 7, there are no changes to their relative positions relative to one another. This also means that the distance between the fixation of the Bowden cable sheathing 14.1 on the second lever 7, and the point of attachment 14.3 of the core 14.2 of the Bowden cable on the first lever 6, does not change. In other words, the entire unit, comprised of the first lever 6, the second lever 7 and the Bowden cable 14, pivots about the pivot shaft 8. Due to the pivot movement of the second lever 7, its third portion 7.5 moves downwardly and thereby presses the push member 12 downwardly, so that ultimately the locking condition between the upper rail 3 and the lower rail 2 is released. The motor vehicle seat, with the control member 10 being held, can now be adjusted to the desired comfort-longitudinal position. Once this is achieved, the control member 10 is released and the entire unit, comprised of the first lever 6, the second lever 7 and the Bowden cable 14, returns to the neutral position, whereby in the first phase this return movement is realized by the push member

12, which is spring loaded toward the bridge portion 9.4, and the leaf spring 15, and subsequently in the second phase, when the push member 12 has reached its locking position, is realized only by the leaf spring 15.

The easy-entry-release of the longitudinal adjustment of the motor vehicle seat is initiated by the forward-folding of the backrest. As a result, tension is applied to the core 14.2 of the Bowden cable 14. This tension is transmitted to the first lever 6, in which the core 14.2 is suspended at the point of attachment 14.3. However, this tension can not act upon the first lever 6 since the latter rests upon the abutment 9.5 of the mounting plate 9. This tension blocking of the core 14.2 leads to an application of pressure by the sheathing 14.1 of the Bowden cable 14 upon the second lever 7, to which it is secured. The second lever 17 therefore pivots about the pivot shaft 8 in the same direction as is the case with comfort-release, so that ultimately the push member 12 is pressed downwardly and the locking between the upper rail 3 and the lower rail 2 is released. The motor vehicle seat can now be shifted toward the front into its easy-entry position.

A locking of the upper rail with the lower rail is effected by again raising the backrest after the motor vehicle seat is shifted out if its easy-entry-longitudinal position into a comfort-longitudinal position. Due to the raising of the backrest, no tension is any longer applied to the core 14.2 of the Bowden cable 14, so that also the sheathing 14.1 of the Bowden cable 14 no longer applies pressure upon the second lever 7, which can then, as with the comfort-release, aided by the push member 12 and the leaf spring 15, pivot into its neutral position. During the described easy-entry-release of the motor vehicle seat, the position of the control handle or member 10 remains unaltered.

The specification incorporates by reference the disclosure of German priority document 10 2010 051 336.9 filed 13 Nov. 2010.

The present invention is, of course, in no way restricted to the specific disclosure of the specification and drawings, but also encompasses any modifications within the scope of the appended claims.

What we claim is:

1. A manually longitudinally adjustable motor vehicle seat, comprising:

a respective rail pair disposed on opposite sides of a motor vehicle seat, wherein each rail pair is comprised of a lower rail, which is configured for securement to a vehicle chassis, and an upper rail, which is longitudinally displaceable in said lower rail and is configured for securement to a component of the motor vehicle seat, and wherein a pivot shaft is secured to said upper rail;

locking mechanisms for securing said upper rails on said lower rails;

release mechanisms for releasing said locking mechanisms, wherein each of said release mechanisms comprises:

a first lever associated with one of said rail pairs, wherein said first lever is pivotably seated on said pivot shaft;

a second lever associated with one of said rail pairs, wherein said second lever is also pivotably seated on said pivot shaft, further wherein said second lever is provided with take-along means, and wherein said second lever is operatively connected to said locking mechanism;

a control member operatively connected to said first lever and said second lever for a comfort-related longitudinal adjustment of the motor vehicle seat, wherein said first lever is connected to said control member and is configured such that upon operation of said control member, said first lever pivots on said pivot shaft and synchronously pivots said second lever, via said take-along means, for release of said locking mechanism;

a Bowden cable connected to the backrest of the motor vehicle seat and configured for an easy-entry related longitudinal adjustment of the motor vehicle seat when the backrest is folded forward into an easy-entry-position, wherein a core of said Bowden cable is attached to said first lever, and wherein a sheathing of said Bowden cable is secured to said second lever; and an abutment secured to said upper rail, wherein said first lever, in a non-actuated, neutral position, rests upon said abutment, and wherein said core presses said first lever against said abutment.

2. A manually longitudinally adjustable motor vehicle seat according to claim 1, which further comprises a mounting plate having securement flanges, wherein said mounting plate is secured to said upper rail via said securement flanges, further wherein said mounting plate has a mounting flange that extends downwardly on an inner side of said rail pair, and wherein said abutment that is secured to said upper rail is formed on said mounting flange.

3. A manually longitudinally adjustable motor vehicle seat according to claim 2, wherein said mounting plate is further provided with a bridge portion disposed between said securement flanges, and wherein said bridge portion serves as an upper abutment for said second lever in a non-actuated, neutral position of said second lever.

4. A manually longitudinally adjustable motor vehicle seat according to claim 3, which further comprises spring means, wherein said spring means bias said second lever against said abutment.

5. A manually longitudinally adjustable motor vehicle seat, according to claim 4, wherein said abutment is formed by a rubber buffer.

6. A manually longitudinally adjustable motor vehicle seat according to claim 2, wherein said mounting plate is embodied as a monolithic shaped sheet metal part.

* * * * *